United States Patent
Lovejoy

(10) Patent No.: US 8,823,331 B2
(45) Date of Patent: Sep. 2, 2014

(54) PERMANENT MAGNET GENERATOR

(75) Inventor: Kim A. Lovejoy, Waukesha, WI (US)

(73) Assignee: Lovejoy Controls Corporation, Waukesha, WI (US)

( * ) Notice: Subject to any disclaimer, the term of this patent is extended or adjusted under 35 U.S.C. 154(b) by 396 days.

(21) Appl. No.: 13/233,805

(22) Filed: Sep. 15, 2011

(65) Prior Publication Data

US 2013/0069604 A1    Mar. 21, 2013

(51) Int. Cl.
  *H02P 9/48*       (2006.01)
  *H02P 9/00*       (2006.01)
  *H02K 7/12*       (2006.01)
  *H02K 21/02*      (2006.01)

(52) U.S. Cl.
  CPC ............... *H02P 9/48* (2013.01); *H02K 21/025* (2013.01)
  USPC .............. 322/30; 322/51; 310/68 E; 310/191; 310/152

(58) Field of Classification Search
  USPC .............. 310/191, 68 E, 209; 322/30, 49–51; 200/80 R
  See application file for complete search history.

(56) References Cited

U.S. PATENT DOCUMENTS

| | | | |
|---|---|---|---|
| 1,153,076 A * | 9/1915 | Heinze .......................... | 310/191 |
| 2,484,197 A * | 10/1949 | Veldhuis ........................ | 290/44 |
| 2,892,144 A | 6/1959 | Kober | |
| 3,214,675 A | 10/1965 | Foster | |
| 3,401,290 A | 9/1968 | Potter | |
| 3,444,405 A | 5/1969 | Ellis | |
| 3,681,632 A | 8/1972 | Sliger | |
| 3,900,749 A | 8/1975 | Carriker | |
| 4,025,840 A | 5/1977 | Brissey et al. | |
| 4,210,836 A | 7/1980 | Kouba | |
| 4,920,295 A * | 4/1990 | Holden et al. ................. | 310/209 |
| 5,053,659 A * | 10/1991 | Parker .......................... | 310/68 E |
| 5,116,567 A | 5/1992 | Fennern | |
| 5,120,494 A | 6/1992 | Nazareno et al. | |
| 5,627,419 A | 5/1997 | Miller | |
| 5,691,587 A * | 11/1997 | Lamb ........................... | 310/103 |
| 5,789,822 A | 8/1998 | Calistrat et al. | |
| 6,057,622 A | 5/2000 | Hsu | |
| 6,072,258 A | 6/2000 | Lamb | |
| 6,087,750 A | 7/2000 | Raad | |
| 6,137,203 A | 10/2000 | Jermakian et al. | |

(Continued)

FOREIGN PATENT DOCUMENTS

CN    201038949    3/2008
EP    0926806    3/2000

(Continued)

*Primary Examiner* — Burton Mullins
(74) *Attorney, Agent, or Firm* — Ryan Kromholz & Manion, S.C.

(57) ABSTRACT

A permanent magnet generator having the unique feature of a speed proportionally adjusted air gap for self-regulation of coil output voltage over a wide range of operating rotational speed of a steam turbine to which the invention is coupled. The Permanent Magnet Generator rotor is supported by the turbine end shaft and the stator is supported by a bracket bolted to the turbine pedestal base or other rigid structure. The speed proportional air gap is accomplished through the use of a plurality of centrifugal flyweights in mechanical coupling to a spool piece under spring load and to corresponding rare earth magnets via linkage such that increasing rotor speed extends the flyweights outward from the rotor center of rotation and draws the rare earth magnets closer to the rotor center of rotation and thus increases the air gap.

11 Claims, 6 Drawing Sheets

(56) References Cited

U.S. PATENT DOCUMENTS

| | | | |
|---|---|---|---|
| 6,166,463 A | 12/2000 | Woodward, Jr. | |
| 6,194,802 B1 | 2/2001 | Rao | |
| 6,239,583 B1 | 5/2001 | Lindbery et al. | |
| 6,249,069 B1 | 6/2001 | Krueger | |
| 6,455,975 B1 | 9/2002 | Raad et al. | |
| 6,469,412 B1 | 10/2002 | Patarchi | |
| 6,492,753 B2 | 12/2002 | Zepp et al. | |
| 6,555,941 B1 * | 4/2003 | Zepp et al. | 310/191 |
| 6,566,783 B2 | 5/2003 | Hatz et al. | |
| 6,727,630 B1 | 4/2004 | Maslov et al. | |
| 6,844,647 B2 | 1/2005 | Horber | |
| 7,034,427 B2 | 4/2006 | Hirzel | |
| 7,042,128 B2 | 5/2006 | Zepp et al. | |
| 7,385,332 B2 | 6/2008 | Himmelmann et al. | |
| 7,443,064 B2 | 10/2008 | Kihara et al. | |
| 7,528,514 B2 * | 5/2009 | Cruz et al. | 310/103 |
| 7,531,931 B2 | 5/2009 | Hashiba et al. | |
| 7,737,591 B2 | 6/2010 | Himmelmann et al. | |
| 7,750,522 B2 | 7/2010 | Gizaw et al. | |
| 7,777,384 B2 | 8/2010 | Gieras et al. | |
| 7,859,231 B2 | 12/2010 | Gieras et al. | |
| 7,948,141 B2 | 5/2011 | Takeuchi | |
| 7,960,888 B2 | 6/2011 | Ai et al. | |
| 8,072,190 B2 | 12/2011 | Tormanen et al. | |
| 2005/0104469 A1 | 5/2005 | Zepp et al. | |
| 2006/0273682 A1 | 12/2006 | Kawamura | |
| 2008/0265702 A1 | 10/2008 | Yeh | |
| 2009/0134849 A1 | 5/2009 | Gottfried | |
| 2009/0251020 A1 | 10/2009 | Gieras et al. | |
| 2009/0256429 A1 | 10/2009 | Fan | |
| 2010/0259208 A1 | 10/2010 | Hao et al. | |
| 2010/0264768 A1 | 10/2010 | Alfermann et al. | |
| 2011/0074238 A1 | 3/2011 | Ai et al. | |
| 2011/0101815 A1 | 5/2011 | Finkle et al. | |
| 2011/0121676 A1 | 5/2011 | Zhu et al. | |

FOREIGN PATENT DOCUMENTS

| | | | | |
|---|---|---|---|---|
| GB | 0880711 | | 2/1958 | |
| JP | 04-251534 | * | 9/1992 | H02K 1/27 |
| JP | 07-288940 | * | 10/1995 | H02K 1/27 |
| JP | 08-251894 | * | 9/1996 | H02K 21/22 |
| JP | 09-65591 | * | 3/1997 | H02K 1/27 |
| JP | 2003-284271 | * | 10/2003 | H02K 1/27 |
| WO | WO 92/01289 | | 1/1992 | |
| WO | WO 92/01297 | | 1/1992 | |
| WO | WO 2008007771 | | 1/2008 | |

* cited by examiner

PERMANENT MAGNET GENERATOR

BACKGROUND OF THE INVENTION

The present invention is a permanent magnet generator designed to be coupled with a power source such as a steam turbine. It is ideally suited for application in nuclear power plants. Natural disasters, for example the May 2011 disaster following the tsunami at the Tokyo Electric Fukushima Nuclear Power Plant, evidence a flaw in the design of emergency reactor cooling water systems with potentially devastating consequences. Lessons learned from past disasters include the irrefutable conclusion that the electrical power primary and backup systems feeding the reactor core cooling injection pump drive steam turbines are subject to failure by natural disaster leading to a potential reactor core melt down, danger to and loss of human life, and long term irreversible environmental damages.

In order to lessen the probability of disaster and its associated consequences, the steam turbine controls for the Safety Related (as defined by the United States Congressional Federal Register 10 CFR 50 Part B) steam turbines need to have no reliance upon the plant power feeds. The Safety Related steam turbine control components of the speed governor and electric valve actuator for operating the turbine governor valve need to be fully self-powered by a source of the mechanical energy of the controlled turbine, thereby independent of the external power sources or plant-run power feeds that are commonly subject to failure in a natural disaster.

A complication of Safety Related turbine speed control is the "open governor valve" start position to place the turbine in operation. To be prepared for emergency pumping tasks, the Safety Related turbine governor valve actuator has the governor valves initially open in a fail-safe position under spring load. When the steam pressure is applied to the turbine (by an external valve), the turbine immediately begins acceleration from rest. In common applications, there is no acceleration control. Some nuclear plants have lessened acceleration by implementing small bypass steam lines admitting less steam flow and resulting in more gradual turbine rotor acceleration, but all operate on a similar starting logic. Any proposed turbine speed control system has the task of becoming functional at a low turbine shaft speed, at or near 500 revolutions per minute (RPM), and responding to limit the initial speed surge. Failure to respond by closing the turbine governor valve to the speed throttling position quickly results in excess acceleration and turbine over-speed trip, or safety shut-down of the turbine. Original equipment turbine speed control systems from the previous century were plagued with poor responding hydraulic control systems which often could not retard the acceleration quick enough due to susceptibility to operating oil contamination, air in the hydraulic oil and friction from long term inactivity.

Conventional permanent magnet generators can be coupled to turbine shafts to produce electrical power, but cannot provide electrical power over the required wide speed range, typically 500 RPM to 5,000 RPM due to basic electromagnetic properties. If a permanent magnetic generator coupled to a Safety Related turbine is designed for proper coil output voltage at 500 RPM for a control system power feed, the coil output voltage will increase proportional to further turbine speed increase. This results in a ten-fold over-voltage output at 5,000 RPM which exceeds potentials and which will likely destroy electrical components in the rectification and shunt voltage regulation or limitation circuits.

Newer generation Safety Related turbine speed control designs have implemented the use of electric actuators utilizing electric motors and roller screw engagement devices to position governor valves. Although the electric actuator represents a vast improvement over the previous hydraulic systems in reliability and reduced maintenance requirements, until this invention there was no means to power the electric actuator and connecting servo drive other than with plant AC or DC busses which are typically the items of failure in a natural disaster, including the tsunami at Fukushima.

Previous work has established some degree, but not total turbine self-powering. For example, U.S. Pat. No. 5,789,822 to Calistrat et al. utilizes the low power generation of magnetic speed probes to self-power the electronic governor, but does not address the much greater electrical power demand of operating the governor steam valve and therefore must use a non-electric, hydraulic-positioned governor valve with accompanying high failure potential and complexity.

Other work has centered on designs of permanent magnet generators for general applications which either have no voltage regulating capability or use complex electrical apparatus to compensate for limited variable speed operation. Due to the required radiation survival criteria for Safety Related turbine applications, complex electrical apparatus is not feasible, nor reliable, and the extreme range of speed of operation of a Safety Related turbine, again typically 500 RPM to 5,000 RPM, at a 1:10 ratio, is beyond the compensating ranges of the prior art. Any suitable device must withstand an environment having radiation levels on the magnitude of $10^5$ rads.

Further art has uniformly centered on devices and configurations to improve the generation efficiency of permanent magnet generators, but none is like the subject invention which utilizes a decrease in generation efficiency to simplify regulation and make the power feed system more robust with fewer failure potential components.

The physical components of permanent magnet generators in basic form consist of sets of permanent magnets and wire-wound coils in proximity under a relative velocity. A key property of permanent magnet generators is the magnet-to-coil proximity, also known as the "air gap". The magnetic flux density of the magnets decreases proportionately with the magnitude of the air gap. The generated voltage across a coil is proportional to the flux density at a given relative velocity, and increases proportionately with relative velocity.

The generated voltage can be expressed with the following formula:

$$V = N dI'/dt$$

where
 V=voltage generated at each stator coil
 I'=instantaneous value of the magnetic flux cutting the stator coil under magnetic rotation
 I=peak magnetic flux density at near-zero air gap
 s=air gap distance
 N=number of stator coil turns and
 I'=I/s Therefore a voltage compensation of increasing velocity can be accomplished by simultaneous increasing the air gap at the cost of decreasing generator efficiency. Since efficiency is of minor importance in light of Safety Related turbine operation, and the overall device mechanical load on the turbine is small, sacrificing efficiency for robust power generation is a good trade off.

DEFINITIONS

The following definitions are to be given to terms used herein. These definitions are in addition to the customary definitions of the terms. If a conflict should arise, the subject term is to be given both definitions.

10-CFR-50 Part B
  The United States Congressional Federal Register reference for rules concerning nuclear plant equipment.
Air Gap
  The distance between the stator coil and the rotor magnet of a brushless generator device.
Centrifugal Flyweight
  A weight in a rotor which pivots about a pin at a radius at increasing angle with rotor speed.
Electric Valve Actuator
  A brushless motor operated mechanical screw assembly which when the motor turns in either direction causes an operating rod to extend and retract, thus converting the rotary motion to linear motion, for example a linear stroke.
Permanent Magnet Generator
  An electrical generator consisting of one or more permanent magnets in a rotating element and one or more wire coils in a stationary element.
Rare Earth Magnet
  High magnetic flux density permanent magnets constructed of Neodynmium Iron Boron, Samarium Cobalt, Ceramic, or Alnico materials.
Safety Related Turbine
  Steam turbine which drives water pumps in nuclear power plants that are defined as emergency cooling devices in 10-CFR-50. The most common safety related turbines are:
    Auxiliary Feed Pump Turbines and Emergency Feed Pump Turbines in pressurized water reactor plants.
    Reactor Core Coolant Injection, High Pressure Safety Injection, and Low Power Safety Injection turbines in boiling water reactor plants.
Servo Drive
  An electronic control device which operates a brushless motor by constructing three phase alternating current from a direct current feed bus, employing isolated gate bipolar transistors to rapidly switch power waveforms under timing control of a digital signal processor.
Steam Turbine
  A prime mover which converts steam enthalpy to rotational torque at various speeds.
Turbine Governor Valve
  The speed and load controlling steam valve on a steam turbine.
Voltage Regulation
  The process of maintaining stable voltage under varying load and generation conditions.

SUMMARY OF THE INVENTION

The present invention comprises a permanent magnet generator which is designed to couple to a power source, such as a turbine output shaft. The permanent magnet generator utilizes an internal mechanism consisting of a plurality of centrifugal fly weights positioning a coil spring-opposed spool piece which is in turn linked mechanically to magnets in respective alignment to provide magnet travel towards the center of rotation with increased speed due to the greater centripetal force of the flyweight assembly than the rare earth magnet assembly. A plurality of stator coils are positioned along the interior of an annular ring. The resulting magnet motions increase the air gap between the magnets and the stator coils lending fewer flux lines and less flux density to generate less voltage. This increasing air gap action with increased rotational speed is used to counter the inherent increase in coil voltage output in a self-regulating manner.

The permanent magnet generator of the present invention includes a rotor with a plurality of radially positioned linearly movable magnets, the rotor mounted to a steam turbine output shaft, a stationary annular stator with a plurality of radially positioned coils positioned about the rotor and the plurality of magnets being movable to vary an air gap between the magnets and the coils. The centrifugal flyweights may be mechanically coupled with linkage bars and a spring-opposed spool piece to each magnet thereby providing an increasing magnet-to-coil air gap with increasing steam turbine output shaft speed. The magnets are movable responsive to a rotational speed of said rotor. The magnets have sufficient radial position travel to reduce a flux density for purposes of regulating a voltage output from the coils. The centripetal force of the flyweights applied over a pivot moment is greater than the centripetal force of the magnets as applied to the linkage bars and spool piece with the difference in centripetal forces resisted by a coil spring adjacent to the spool piece thereby metering net magnet motion with speed. In my preferred embodiment, the magnets are rare earth magnets. One or more coils may provide a governor speed feedback, the governor speed feedback may in turn be coupled to a steam turbine speed control system. A shunt circuit coupled to at least one coil provides a feed bus for controlling turbine speed.

The invention may also be described as a steam turbine speed control system including the permanent magnet generator described above coupled to a steam turbine governor valve. Alternatively, the permanent magnet generator may include a rotor coupled to a turbine output shaft, the rotor housing a plurality of linearly movable magnets radially arranged about said rotor, each of said magnets being coupled to a centrifugal flyweight, an annular stator having a plurality of coils being positioned about said rotor and a variable air gap being formed between each magnet of said plurality of magnets and each coil of said plurality of coils depending upon a rotational speed of the rotor. Again, each centrifugal flyweight may be coupled to a spring-opposed spool piece by one or more linkage bars. The magnets have sufficient radial position travel relative to the coils to reduce a flux density for regulating voltage output from the coils. Four magnets and four coils are preferred; however, other equivalent counts of magnets and coils could be used in the invention.

DESCRIPTION OF THE PREFERRED EMBODIMENT

Figure 1:
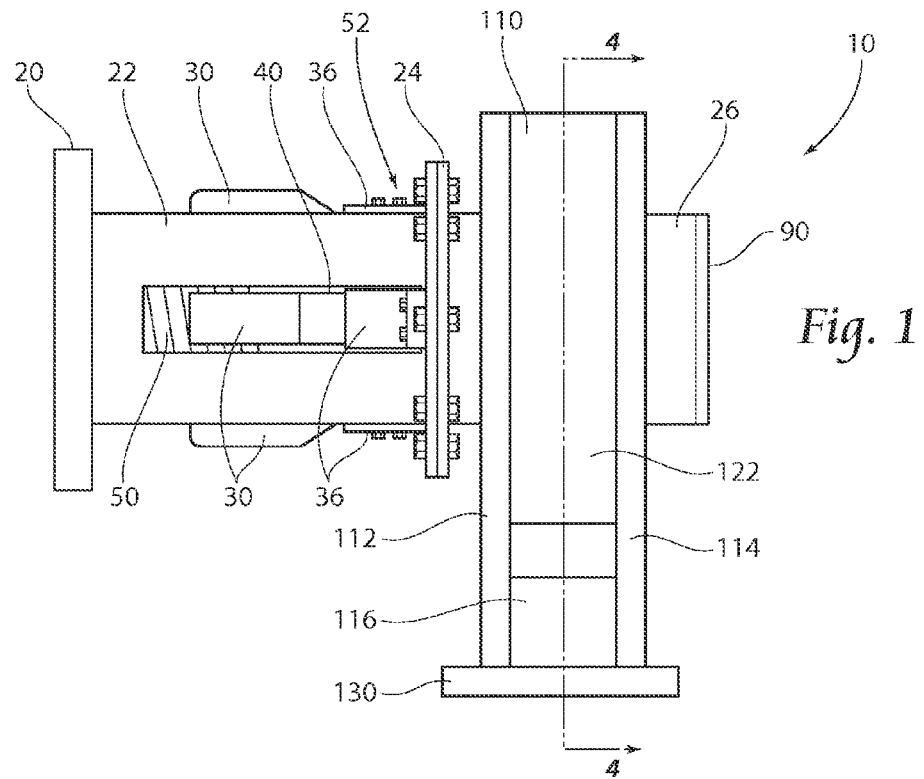
FIG. 1 is a side view of the permanent magnet generator.
Figure 2:
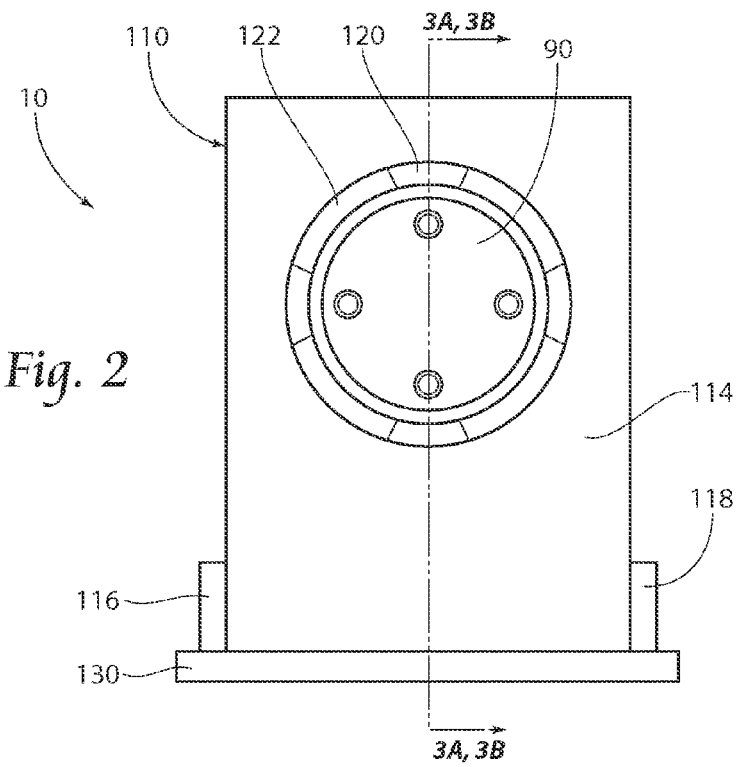
FIG. 2 is a front view of the permanent magnet generator.
Figure 5:
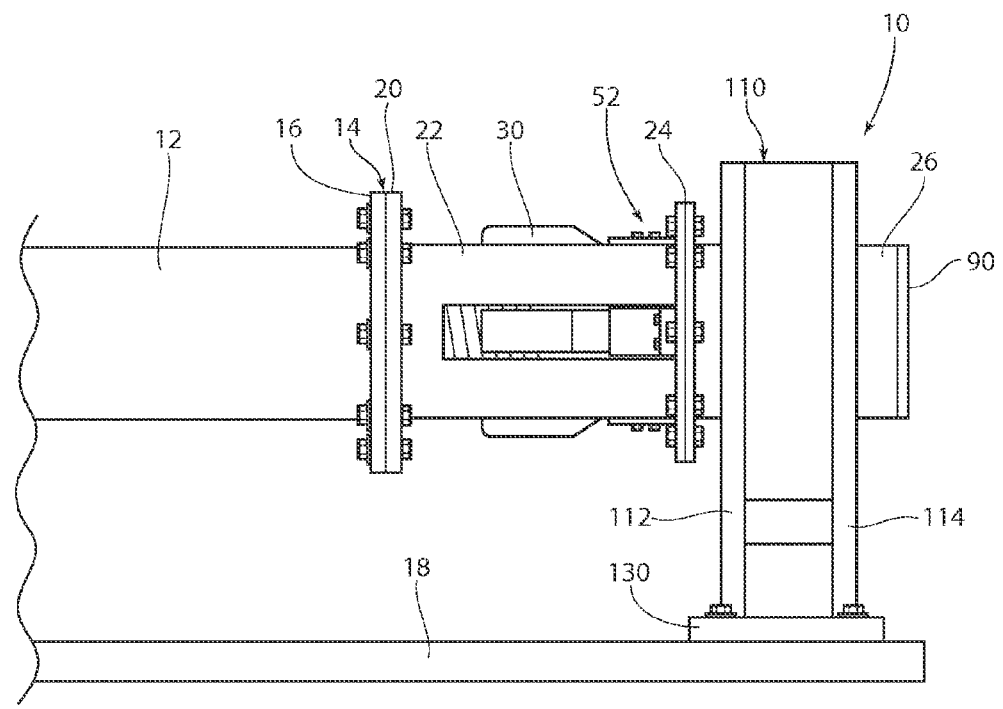
FIG. 5 is a side view showing the permanent magnet generator coupled to a turbine output shaft.

The permanent magnet generator 10 of the present invention couples to a source of rotational motion, such as a turbine. The permanent magnet generator consists primarily of two components including a rotor assembly 52 and a stator assembly 110. As shown in FIGS. 1, 2 and 5, the turbine mating flange 20 bolts to the turbine output shaft through flange bolt holes (not shown) or may thread on as per the turbine end shaft design, and also bolts to the inboard cylinder 22. Inboard cylinder 22 in turn bolts by flange 24 to the outboard cylinder 26 and forms the rotor assembly 52. The turbine bearings (not shown) support the permanent magnet generator rotor 52. The permanent magnet generator 10 stator assembly 110 supporting structure consists of a base 130, inboard stator bracket 112 and outboard stator bracket 114 forming a welded assembly with the stator wheel 122 affixed between the stator brackets 112 and 114. In operating position, the stator wheel 122 is centered about the rotor outboard cylinder 26. Support brackets 116 and 118 also secure the inboard stator bracket 112 and outboard stator bracket 114 to the base 130.

As further shown in FIG. 1, rotor assembly 52 components of the permanent magnet generator include flyweight assemblies 30, flyweight brackets 36, spool piece assembly 40, a coil spring 50 and end plug assembly 90.

Figure 3A:
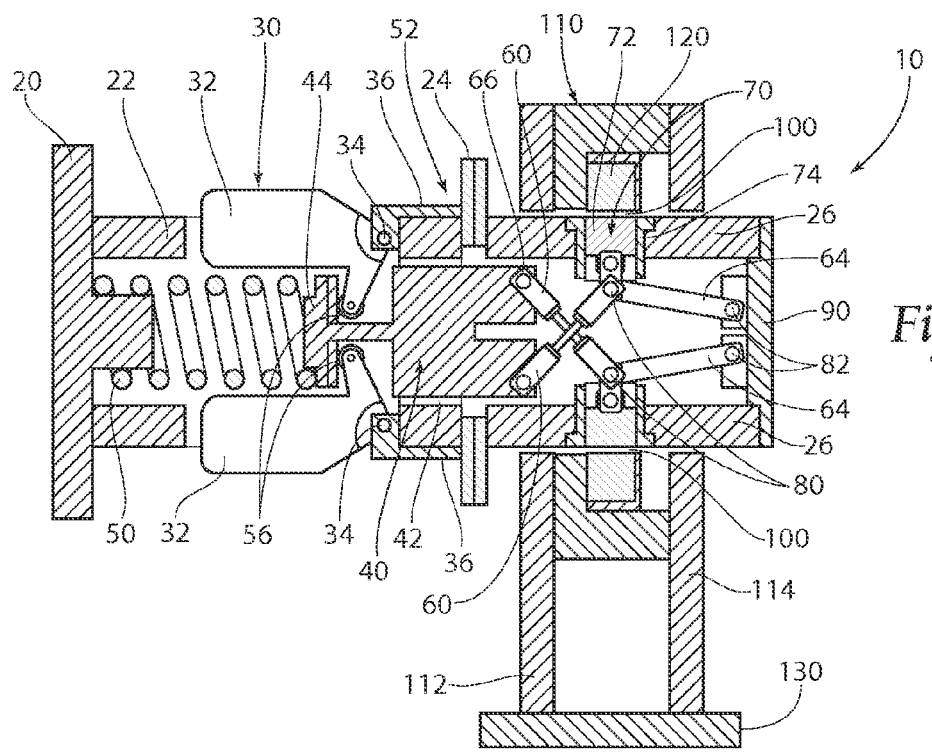
FIG. 3A is a section view of the permanent magnet generator taken at line 3A-3A in FIG. 2.
Figure 3B:
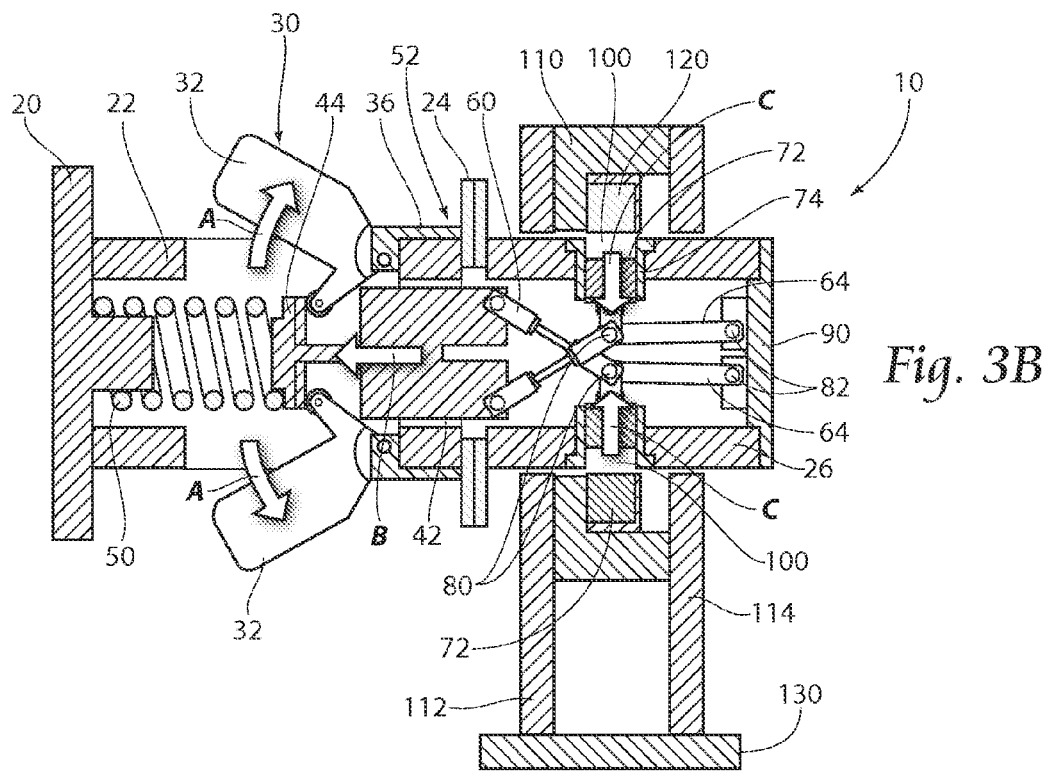
FIG. 3B is a similar section view taken at line 3B-3B in FIG. 2.

Rotational motion from the turbine output shaft 12 is imparted to the inboard 22 and outboard 26 cylinders that make up the rotor assembly 52 through flanges 20 and 24. Now referring to FIGS. 3A and 3B, outward motion of the flyweight assembly 30 under increasing rotational speed of the rotor assembly 52 causes the flyweights 32 to pivot about pins 34 fixed by the flyweight bracket 36 and transmit force to a spool piece assembly 40 which freely moves within a bushing 42. Flyweight assemblies 30 are in positions at an initial functioning rotational speed of 500 RPM as shown in FIG. 3A and in positions at a rotational speed equivalent to the over speed trip set point of the turbine as shown in FIG. 3B. They change position as shown by arrows A in FIG. 3B. The spool piece assembly 40 motion and resulting force is opposed by a coil spring 50 located within the inboard cylinder 22. As the spool piece assembly 40 is displaced to the left as shown by arrow B in FIG. 3B, connected inboard linkage bars 60 pull at the lower pivot points of the magnet assembly 70 and rotate outboard linkage bars 64 about the pivot pins 82 of the end plug assembly 80 with the effect of the rare earth magnets 72 moving within their magnet bushings 74 and being drawn inward and away from the stator coils 120 as shown by arrows C. This action increases the permanent magnetic generator 10 air gap 100 with increasing turbine speed and provides the basis for voltage regulation.

Figure 4:
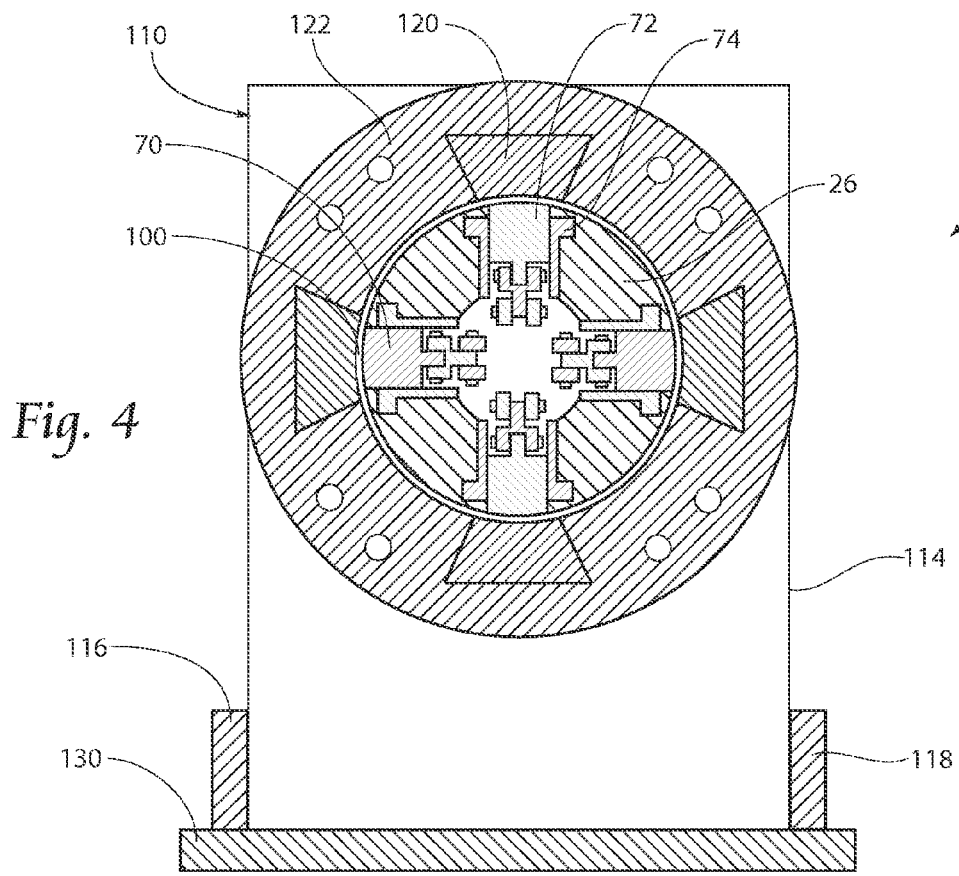
FIG. 4 is a section view of the permanent magnet generator taken at line 4-4 in FIG. 1.

The sectional view of FIG. 4 shows the linkage connections at the magnet assembly 70 and shows one of many configurations of four magnets 72 and four or an equivalent number of stator coils 120. It is to be understood that other counts of magnets 72 and coils 120 could be used without departing from the present invention.

Preferred but not essentially specified materials: inboard cylinder 22, flange 24, outboard cylinder 26 are each aluminum. The turbine mating flange 20, spool piece 40, end plug assembly 80, stator brackets 112, 114, 116 and 118 are each nickel-plated steel. The spool piece bushing 42, the magnet bushing 74, and ail linkage bar pivot bushings are oil-impregnated bronze. The stator wheel 122 is a phenolic material. The stator coils 120 are magnet wire coils potted to the stator wheel 122 with an appropriate compound. The flyweights 32 are dense-alloy. The magnet assemblies 70 are neodymium iron boron cemented to a nickel-plated steel cup with pivot bosses. The coil spring 50 is spring steel or stainless steel.

The size and number of magnets 72, stator coils 120 and number of wire turns, and gauge of magnet wire are determined by the power requirements of the control system of the target steam turbine unit at low speed, 500 RPM typically. This power is small by conventional generator comparison, falling between 500 Watts and 2,000 Watts. While not required, rare earth magnets are preferable in the magnetic assemblies 70. The flyweight assembly 30 mass is then adjusted to produce a force on the spool piece assembly 40 at the maximum target turbine operating speed (shown in FIG. 3B) sufficient to displace the magnet assemblies 70 inward a distance to reduce the magnetic flux density and thus the coil voltage proportional to the inverse ratio of the maximum target turbine operating speed divided by 500 RPM.

FIG. 5 shows the mechanical installation of the permanent magnet generator 10 on the target turbine output shaft 12 including two part coupling 14 having a flange 16 connected to the turbine end shaft. As described above, flange 20 is connected to the inboard cylinder 22. Flanges 16 and 20 are bolted together as shown. The stator bracket base 130 is also shown in FIG. 5 bolted to the turbine pedestal base 18.

Figure 6:
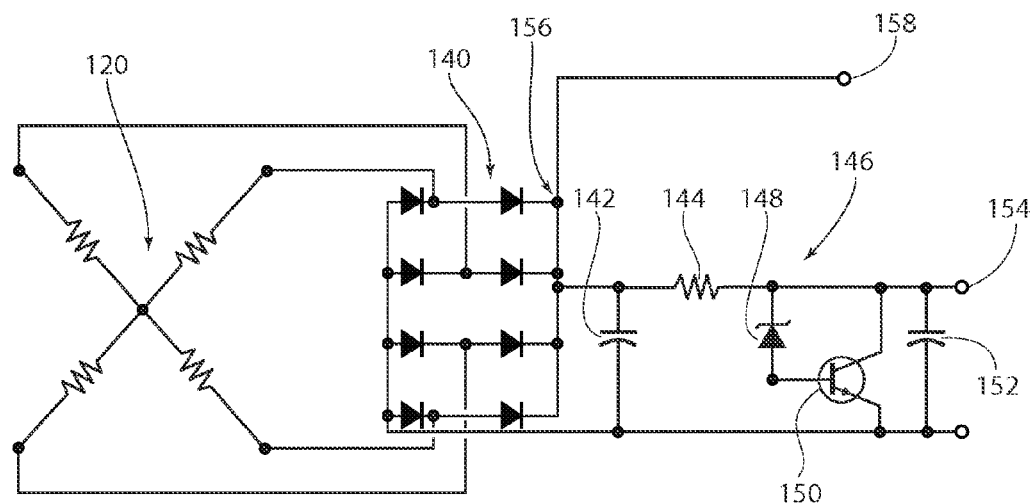
FIG. 6 illustrates the connection of the stator coils to a rectifier and shunt circuit to complete the control system power supply and the speed signal output.

FIG. 6 schematically depicts the typical permanent magnet generator 10 electrical connections. The plurality of stator coils 120 are wired to a full wave rectifier diode bank 140 which has its output smoothed by an alternating current capacitor 142 and then fed through resistor 144 to the voltage shunt circuit 146 comprised of a Zener diode 148 and transistor 150, with direct current capacitor 152 attaching to the final direct current supply output 154. In addition, a rectified coil leg 156 is tapped for use as a speed reference output 158. The permanent magnet generator 10 of the invention provides a steady shunt current to pass the transistor 150 when the turbine is operating at speeds greater than 500 RPM. This shunt current is available immediately to supply at all times if the attached load increases. This shunt current reduces the size required of the direct current capacitor 152.

Figure 7:
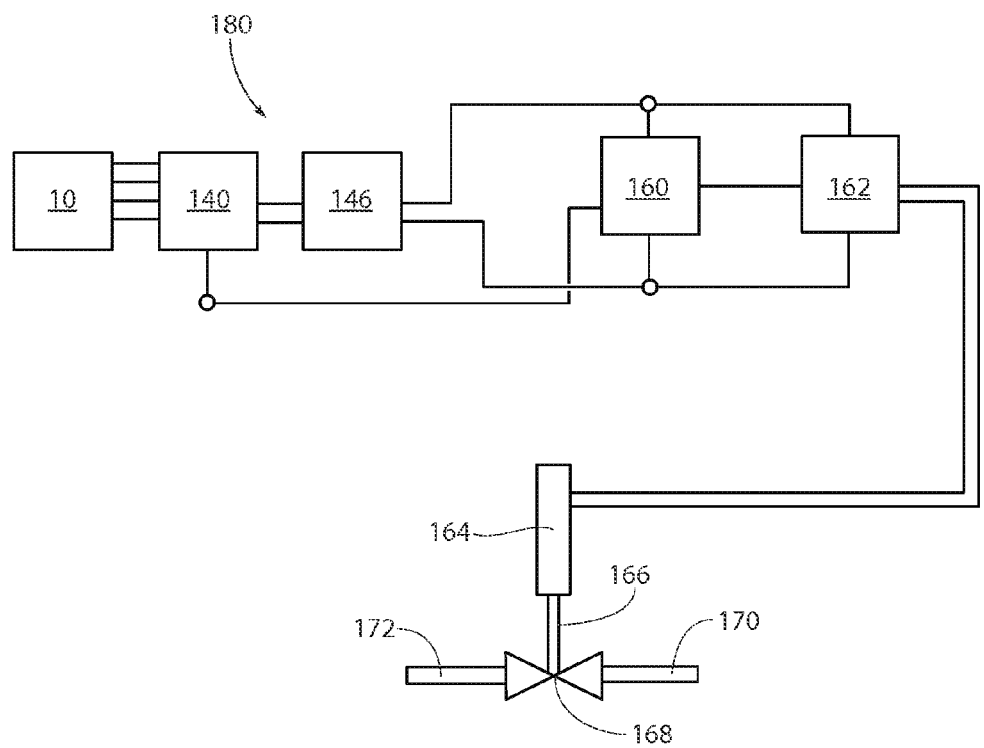
FIG. 7 illustrates the permanent magnet generator in a block diagram connected to the shunt circuit, turbine governor and turbine governor valve electric actuator.

FIG. 7 include all components of the turbine speed control system 180 powered by the permanent magnet generator 10. The permanent magnet generator 10 feeds the rectifier 140 which in turn feeds the voltage shunt 146 of which output becomes the positive DC bus. This positive DC bus powers both the electronic governor 160 and the servo drive 162. The electronic governor 160 produces a bipolar velocity demand output proportional to speed error which is input to the servo drive 162. The servo drive 162 establishes the governor-requested velocity of the electric valve actuator 164 operating shaft 166 which is coupled to the turbine governor valve 168. The turbine governor valve 168 is situated between the turbine steam supply conduit 170 and the conduit 172 that leads to the turbine nozzles (not shown). Thus positive speed error results in proportional turbine governor valve 168 opening velocity and conversely negative speed error results in proportional turbine governor valve 163 closing velocity.

Figure 8:
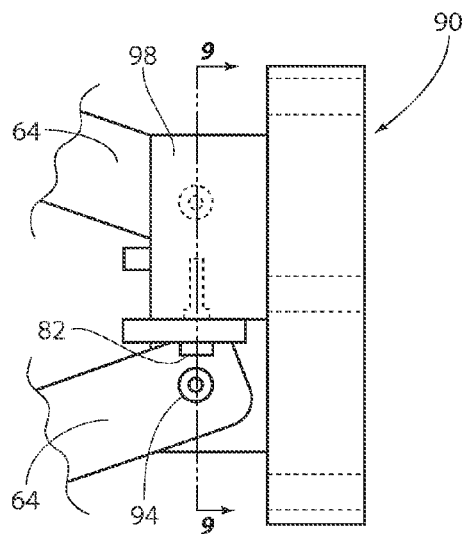
FIG. 8 is a side view of the end plug assembly and linkage bar connections.
Figure 9:
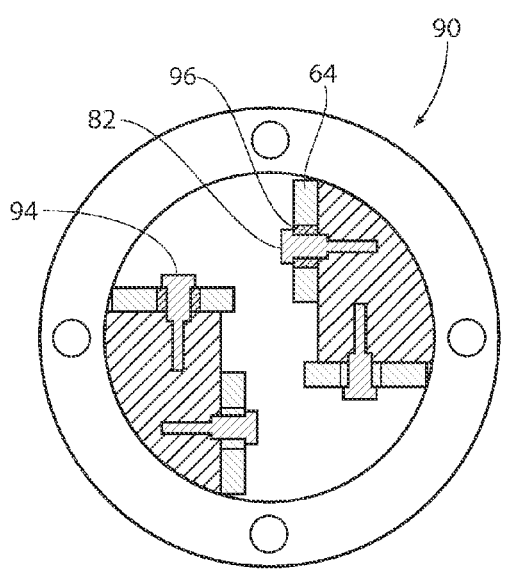
FIG. 9 is a section view of the end plug assembly and linkage bars taken at line 9-9 in FIG. 8.

FIGS. 8 and 9 detail the end plug assembly 90. Each outboard linkage bar 64 connection is made using a shoulder screw/pivot pin 82 recessed into the end plug body 98 and mounting through oil-impregnated bronze bushings 96 within the outboard linkage bars 64.

Figure 10:
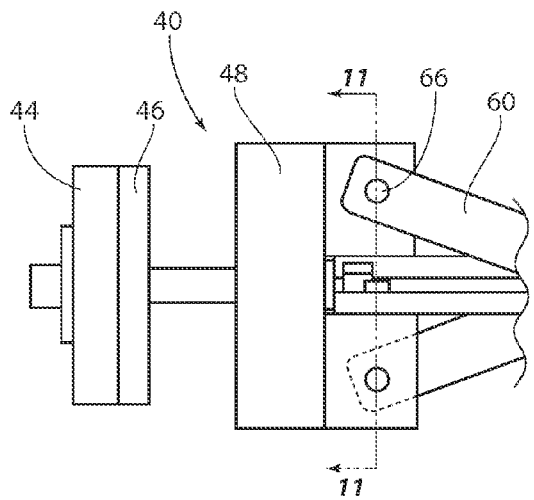
FIG. 10 is a side view of the spool piece assembly and linkage bars.
Figure 11:
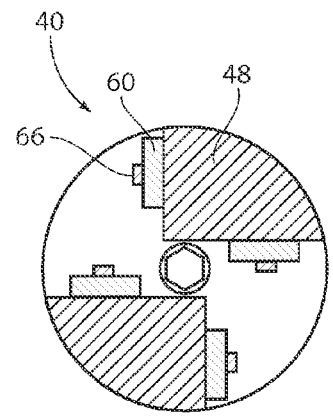
FIG. 11 is a section view of the spool piece assembly and linkage bars taken at line 11-11 in FIG. 10.

FIGS. 10 and 11 show the spool piece assembly 40, consisting of spring seat 44, hardened washer 46 and body 48 attaching to linkage bars 60 using shoulder screws 66 in the same manner as the end plug assembly of FIGS. 8 and 9.

Figure 12:
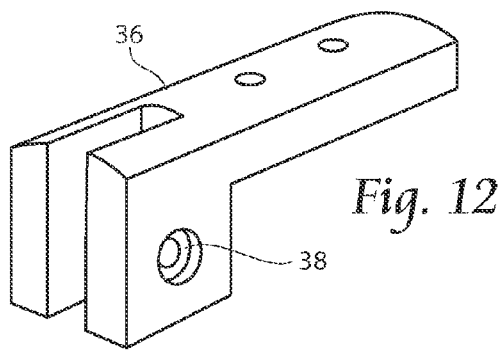
FIG. 12 is a perspective view of a flyweight pivot bracket.

FIG. 12 depicts the flyweight bracket 36. The bracket 36 includes an opening 38 through which each bracket 36 is coupled by pivot pins 34 to each flyweight 32.

Figure 13:
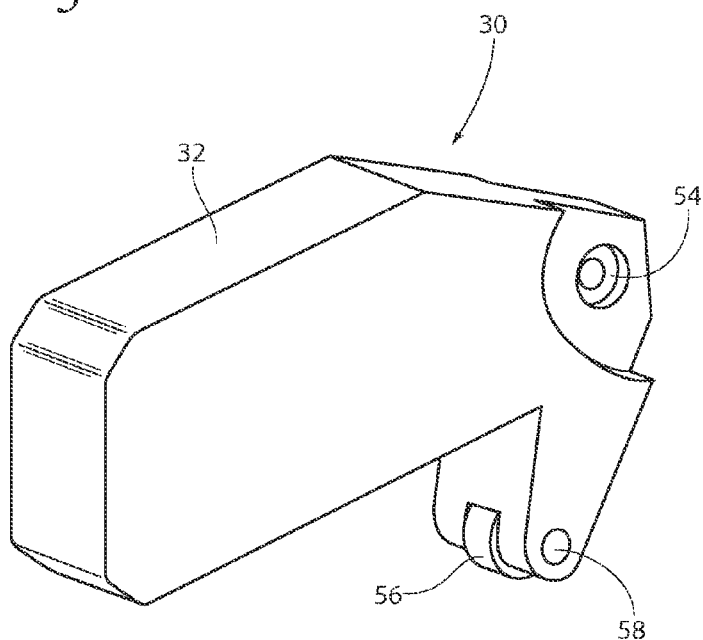
FIG. 13 is a perspective view of a flyweight.

FIG. 13 depicts the flyweight assembly 30 including flyweight 32, pressed bushing 54, and roller 56 with axle 58.

Figure 14:
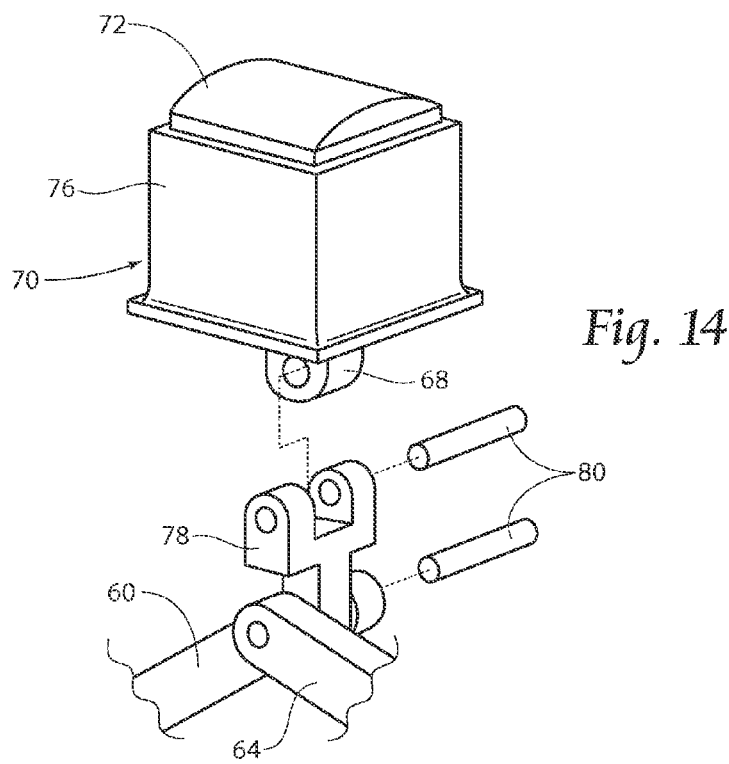
FIG. 14 is a perspective view of a magnet assembly and linkage bars.

FIG. 14 details the magnet assembly 70. Each rare earth magnet 72 is bonded to the nickel-plated magnet cup 76. A yoke 78 is attached by pins 80 and optional bushings (not shown) to both the steel cup mounting boss 68 and the inboard linkage bars 60 and outboard linkage bars 64.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A permanent magnet generator for use with a turbine having an output shaft, the permanent magnet generator comprising:
    a rotor with a plurality of radially positioned linearly movable magnets, said rotor mounted to the steam turbine output shaft;
    a stationary annular stator with a plurality of radially positioned coils;
    the plurality of magnets being movable to vary an air gap between said magnets and said coils; and
    a plurality of centrifugal flyweights mechanically coupled with linkage bars and a spring-opposed spool piece to each magnet of the plurality of magnets thereby providing an increasing magnet-to-coil air gap with increasing turbine output shaft speed.

2. A permanent magnet generator of claim 1 whereby the magnets are movably responsive to a rotational speed of said rotor.

3. A permanent magnet generator of claim 1 whereby the plurality of magnets have sufficient radial position travel to reduce a flux density for purposes of regulating a voltage output from said plurality of coils.

4. A permanent magnet generator of claim 1 whereby the centripetal force of the plurality of flyweights applied over a pivot moment is greater than the centripetal force of the plurality of magnets as applied to the linkage bars and spool piece with the difference in centripetal forces resisted by a coil spring adjacent to the spool piece thereby metering net magnet motion with speed.

5. A permanent magnet generator of claim 1 wherein the magnets comprise rare earth magnets.

6. A permanent magnet generator for use with a turbine having an output shaft, the permanent magnet generator comprising:
    a rotor coupled to said output shaft;
    said rotor housing a plurality of linearly movable magnets radially arranged about said rotor;
    each of said magnets of said plurality of magnets being coupled to a centrifugal flyweight;
    an annular stator having a plurality of coils being positioned about said rotor;
    each centrifugal flyweight being coupled to a spring-opposed spool piece by one or more linkage bars; and
    whereby an air gap formed between each magnet (of said plurality of magnets and each coil of said plurality of coils varies depending upon a rotational speed of said rotor.

7. A permanent magnet generator of claim 6 wherein the plurality of magnets have sufficient radial position travel relative to the plurality of coils to reduce a flux density for regulating voltage output from said plurality of coils.

8. A permanent magnet generator of claim 6 whereby the centripetal force of the plurality of flyweights applied over a pivot moment is greater than the centripetal force of the plurality of magnets as applied to the linkage bars and spool piece with the difference in centripetal forces resisted by a coil spring adjacent to the spool piece thereby metering net magnet motion with speed.

9. A permanent magnet generator of claim 6 wherein the magnets comprise rare earth magnets.

10. A permanent magnet generator of claim 6 wherein the coils of the plurality of coils further comprise coil outputs.

11. A permanent magnet generator of claim 6 whereby the magnets are movably responsive to a rotational speed of said rotor.

* * * * *